United States Patent
Li et al.

(10) Patent No.: US 10,026,381 B2
(45) Date of Patent: Jul. 17, 2018

(54) METHOD AND DEVICE FOR ADJUSTING AND DISPLAYING IMAGE

(71) Applicant: Xiaomi Inc., Beijing (CN)

(72) Inventors: Guosheng Li, Beijing (CN); Anyu Liu, Beijing (CN); Guilin Zhong, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 15/287,752

(22) Filed: Oct. 7, 2016

(65) Prior Publication Data

US 2017/0103733 A1 Apr. 13, 2017

(30) Foreign Application Priority Data

Oct. 8, 2015 (CN) .......................... 2015 1 0645538

(51) Int. Cl.
| | | |
|---|---|---|
| *G09G 5/00* | (2006.01) | |
| *G09G 5/38* | (2006.01) | |
| *G06F 3/01* | (2006.01) | |
| *G06T 3/40* | (2006.01) | |
| *G06T 3/60* | (2006.01) | |
| *G06T 3/00* | (2006.01) | |

(52) U.S. Cl.
CPC .............. *G09G 5/38* (2013.01); *G06F 3/011* (2013.01); *G06T 3/0006* (2013.01); *G06T 3/40* (2013.01); *G06T 3/60* (2013.01); *G09G 2340/045* (2013.01); *G09G 2340/0492* (2013.01); *G09G 2354/00* (2013.01)

(58) Field of Classification Search
CPC .............. G09G 5/38; G09G 2340/045; G09G 2340/0492; G09G 2354/00; G06F 3/011; G06T 3/0006; G06T 3/40; G06T 3/60
See application file for complete search history.

(56) References Cited

U.S. PATENT DOCUMENTS

| | | | | |
|---|---|---|---|---|
| 5,140,650 A | * | 8/1992 | Casey ................... | G06F 17/243 382/176 |
| 5,686,940 A | * | 11/1997 | Kuga .................... | G06F 3/0485 345/156 |

(Continued)

FOREIGN PATENT DOCUMENTS

| | | |
|---|---|---|
| CN | 101499253 A | 8/2009 |
| CN | 101894538 A | 11/2010 |

(Continued)

OTHER PUBLICATIONS

International Search Report for PCT/CN2015/098850.
(Continued)

*Primary Examiner* — Abderrahim Merouan
(74) *Attorney, Agent, or Firm* — Jun He Law Offices P.C.; James J. Zhu

(57) ABSTRACT

A method and a device for adjusting and displaying an image are provided. The method includes: monitoring the distance between a user in front of a display screen and the display screen; when monitoring that a distance between the user and the display screen is less than a preset threshold, determining an adjusted size of an image on the display screen according to the distance; and displaying the image on the display screen according to the adjusted size.

17 Claims, 11 Drawing Sheets

(56) References Cited

U.S. PATENT DOCUMENTS

| | | | | |
|---|---|---|---|---|
| 8,754,831 | B2* | 6/2014 | Kollin | G06F 1/1637 345/32 |
| 9,647,780 | B2* | 5/2017 | Jung | G06F 3/011 |
| 2004/0246272 | A1* | 12/2004 | Ramian | G06F 3/011 345/660 |
| 2005/0229200 | A1* | 10/2005 | Kirkland | G06F 3/0481 725/12 |
| 2008/0174865 | A1* | 7/2008 | Stewart | G03B 21/60 359/450 |
| 2009/0051542 | A1* | 2/2009 | Jung | G06F 3/011 340/573.1 |
| 2011/0254846 | A1* | 10/2011 | Lee | G06F 3/011 345/427 |
| 2012/0120061 | A1* | 5/2012 | Noda | G06F 3/0418 345/419 |
| 2012/0120064 | A1* | 5/2012 | Noda | G06F 3/041 345/419 |
| 2014/0184651 | A1* | 7/2014 | Saishu | G02B 27/027 345/660 |
| 2017/0094267 | A1* | 3/2017 | Nakamura | H04N 13/0497 |

FOREIGN PATENT DOCUMENTS

| | | |
|---|---|---|
| CN | 104125495 A | 10/2014 |
| CN | 104461434 A | 3/2015 |
| JP | H11272251 A | 10/1999 |
| JP | 2007158787 A | 6/2007 |
| JP | 2010026327 A | 2/2010 |
| JP | 2010279010 A | 12/2010 |
| JP | 2013115644 A | 6/2013 |
| JP | 2014191506 A | 10/2014 |
| JP | 2015002540 A | 1/2015 |
| KR | 20040077609 A | 9/2004 |
| KR | 20110094367 A | 8/2011 |
| RU | 2514099 C2 | 7/2012 |
| WO | 2014/084193 A1 | 6/2014 |

OTHER PUBLICATIONS

Extended European Search Report for EP Application No. 16191052.6 dated Jan. 2, 2017.
Office action for RU Application No. 2016112134 dated May 15, 2017.

* cited by examiner

METHOD AND DEVICE FOR ADJUSTING AND DISPLAYING IMAGE

CROSS-REFERENCE TO RELATED APPLICATIONS

This application is based upon and claims priority to Chinese Patent Application No. 201510645538.2 filed Oct. 8, 2015, the entire contents of which are incorporated herein by reference.

TECHNICAL FIELD

The present disclosure relates to field of smart display technologies, and more particularly, to a method and a device for adjusting and displaying an image.

BACKGROUND

There are requirements on a viewing distance and a viewing angle for watching television (TV), and it is easy to cause visual fatigue or affect the viewing experience if the distance and the angle are inappropriate.

As to terminals having display screens (such as TVs), for watching the display screens with different sizes, different viewing distances and different viewing angles are required.

SUMMARY

The embodiments of the present disclosure provide a method and a device for adjusting and displaying an image.

According to a first aspect of embodiments of the present disclosure, there is provided a method for adjusting and displaying an image, including: monitoring a distance between a user in front of a display screen and the display screen; when monitoring that the distance between the user and the display screen is less than a preset threshold, determining an adjusted size of an image on the display screen according to the distance; and displaying the image on the display screen according to the adjusted size.

According to a second aspect of embodiments of the present disclosure, there is provided a device for adjusting and displaying images, including: a processor; a display screen and a memory for storing instructions executable by the processor. The processor is configured to: monitor a distance between a user in front of the display screen and the display screen; when monitoring that the distance between the user and the display screen is less than a preset threshold, determine an adjusted size of an image on the display screen according to the distance; and display the image on the display screen according to the adjusted size.

According to a third aspect of the embodiments of the present disclosure, there is provided a non-transitory computer-readable storage medium including instructions, executable by a processor in a device, for performing method for adjusting and displaying an image, the method including: monitoring a distance between a user in front of a display screen and the display screen; when monitoring that the distance between the user and the display screen is less than a preset threshold, determining an adjusted size of an image on the display screen according to the distance; and displaying the image on the display screen according to the adjusted size.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
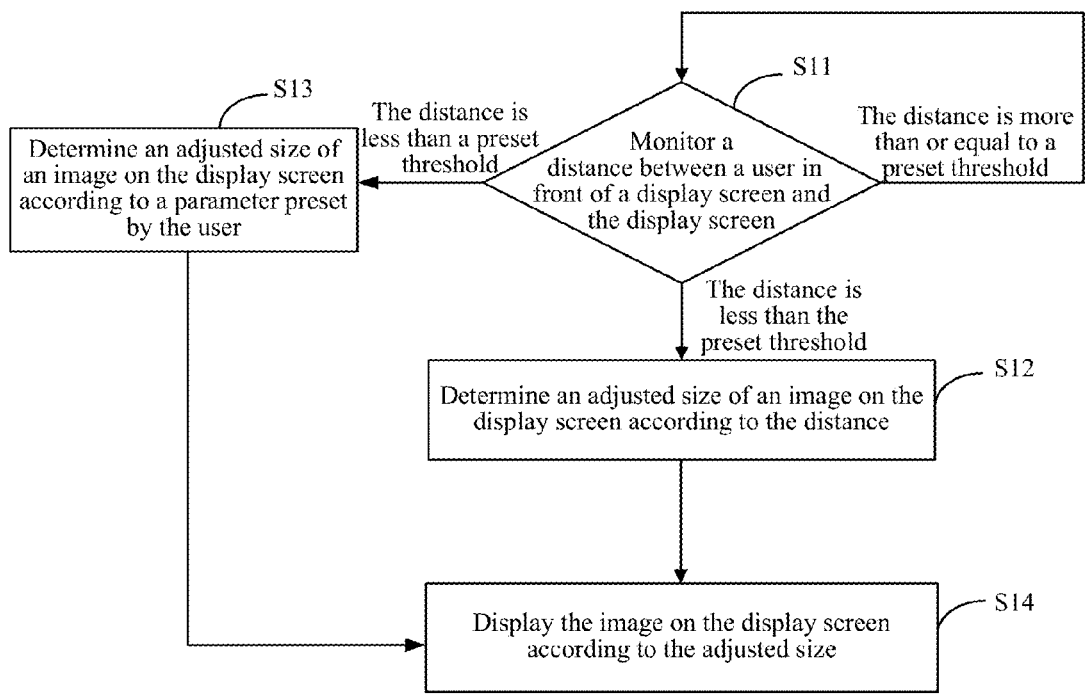
FIG. 1 is a flow chart of a method for adjusting and displaying an image, according to an exemplary embodiment.

FIG. 1 is a flow chart of a method for adjusting and displaying an image, according to an exemplary embodiment. As shown in FIG. 1, the method includes the following steps.

In step S11, a distance between a user in front of a display screen and the display screen is monitored. When monitoring that the distance between the user and the display screen is less than a preset threshold, step S12 or S13 is performed.

In step S12, an adjusted size of the image on the display screen is determined according to the distance.

In step S13, the adjusted size of the image on the display screen is determined according to a parameter preset by the user.

In step S14, the image is displayed on the display screen according to the adjusted size.

The foregoing method provided by the embodiments of the present disclosure may be applied to various player terminals, for example, such devices including a TV, a computer display or the like, as long as the devices have functions of playing videos and images, which will not be limited by the embodiments of the present disclosure.

According to the method for adjusting and displaying an image provided by the embodiment of the present disclosure, when monitoring that the distance between the user and the display screen is less than the preset threshold, it is determined the current distance of the user from the display screen is not a preferable viewing distance, then the adjusted size of the image on the display screen is determined according to the distance, or the adjusted size of the image on the display screen is determined according to the parameter preset by the user; and then the adjusted image is displayed on the display screen; the solution of adaptively adjusting the size of the image according to the change of the viewing distance of the user can improve the viewing experience while avoiding the user from visual fatigue and protecting the eyesight of the user.

The foregoing steps are respectively explained hereinafter.

In one embodiment, in the foregoing step S11, monitoring the distance between the user and the display screen includes one or more of the following manners: taking an image of the user, and determining the distance between the user and the display screen according to the image that is taken; and monitoring a wireless signal sent by the user, and determining the distance between the user and the display screen according to an intensity of the wireless signal.

During implementation, the image of the user in front of the display screen may be captured by setting an image collection apparatus such as a camera in the player terminal, and the distance between the user and the display screen can be accurately positioned according to the image that is captured.

The wireless signal sent by the user may be various wireless signals, for example, near field communication signals (wireless signals like bluetooth, infrared, NFC, and radio frequency identification (RFID)), and wireless local area network signals (for example, WIFI signals). The user may send the corresponding wireless signal by carrying an apparatus capable of sending the wireless signal, for example, a mobile phone, and a wearable device like a wristband.

The intensity of the wireless signal like bluetooth signal and WiFi signal is in an inverse correlation relationship with the distance. That is, the larger the intensity is, the closer the distance is. According to this relationship, the distance between a position where the wireless signal is sent by the user and the display screen can be calculated.

The intensity level of the wireless signal is associated with the signal degradation distance, which can be calculated particularly according to a mathematic relation between the intensity of the wireless signal and the distance in the related art.

The foregoing two manners may be used simultaneously or alternatively. When the two manners are used simultaneously, the distance values determined by the two manners may be averaged or weighted averaged according to different accuracies of the two manners, so as to obtain the distance between the user and the display screen.

In order to avoid influences on the watching of the user due to frequent change of the image displayed on the display screen according to the location of the user, in step S12 of the embodiment of the present disclosure, the solution of adjusting the size of the image displayed on the display screen is only triggered when monitoring that the distance between the user and the display screen is less than the preset threshold, wherein the threshold may be determined according to the size of the display screen; because the size of the display screen is usually relative to the preferable viewing distance, the threshold can be preset according to the preferable viewing distance corresponding to the size of the screen.

Figure 2:
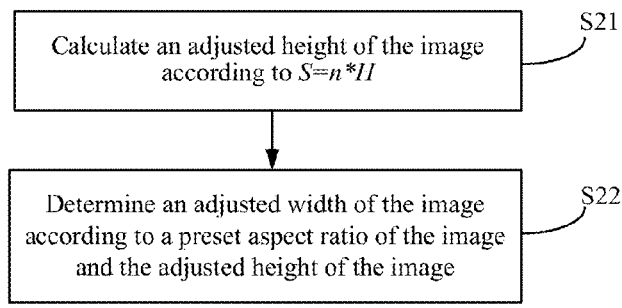
FIG. 2 is a flow chart of step S12, according to an exemplary embodiment.

In one embodiment, as shown in FIG. 2, determining the adjusted size of the image on the display screen according to the distance in step S12 includes steps S21-S22.

In step S21, an adjusted height of the image is calculated according to $S=n*H$, wherein: S is the distance between the user and the display screen, H is the adjusted height of the image, and a range of n is [3.5,5].

As previously mentioned, the preferable viewing distance is usually 3.5-5 times of a display height (the specific value may be determined by referring to pixels per inch (PPI), wherein the higher the PPI is, the smaller the value may be, and the lower the PPI is, the bigger the value may be). Therefore, a proper display height may be inversely reasoned out according to the distance between the user and the display screen.

In step S22, an adjusted width of the image is determined according to a preset aspect ratio of the image and the adjusted height of the image.

All the images have a preset aspect ratio. In order to keep the original viewing effect without causing a sensuous image deformation effect, the adjusted width of the image may be acquired according to the original preset aspect ratio and the adjusted height.

In one embodiment, determining the adjusted size of the image on the display screen according to the parameter preset by the user in step S13 includes: determining an adjusted height and an adjusted width of the image on the display screen according to a scaling preset by the user and an original height and an original width of the image.

In this implementation, the above process may be implemented through two manners. One manner is as follows: a scaling parameter is preset by the user and saved in a player terminal; once the distance between the user and the display screen is less than the preset threshold, the adjusted height and the adjusted width of the image on the display screen are acquired by calculating directly according to the saved scaling preset by the user.

Another manner is as follows: when monitoring that the distance between the user and the display screen is less than the preset threshold, reminding information is sent to the user to remind the user that the size of the currently displayed image is not suitable for the user to watch, and an interactive interface, such as a scaling setting option, is provided to the user for selection in real time. At this moment, the adjusted size of the image is then determined according to the scaling set by the user.

In one embodiment, when taking the image of the user and determining the distance between the user and the display screen according to the image that is taken, the method may also include a step of: determining a relative orientation between the user and the display screen according to a position of the user in the image that is taken, the relative orientation including: center, center-left and center-right.

The foregoing step is performed independently from S12 or S13, and there is no strict order therebetween.

Figure 3:
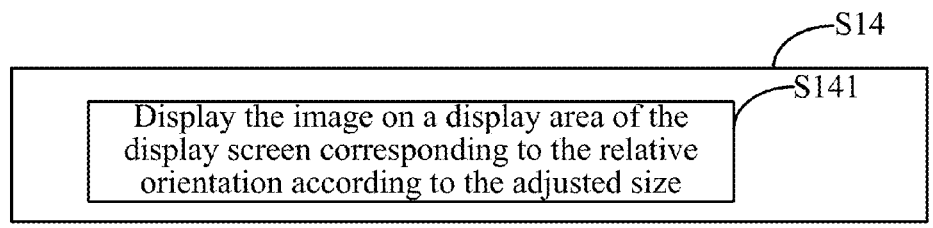
FIG. 3 is a second flow chart of a method for adjusting and displaying an image, according to an exemplary embodiment.

Accordingly, as shown in FIG. 3, displaying the image on the display screen according to the adjusted size in the foregoing step S14 may be implemented as the following step S141.

In step S141, the image is displayed on a display area of the display screen corresponding to the relative orientation according to the adjusted size.

For example, besides the user, the image that is taken further includes other articles in the space where a player locates, and these articles may be used as references to determine the relative orientation between the user and the display screen. For instance, in an bedroom circumstance, the dead ahead of the display screen of the player is a bed, the left front side thereof is a wardrobe, and the right front side thereof is a floor lamp, then it may be determined whether the user is in a center, a center-left or a center-right with respect to the display screen according to the identification of a position relationship between the user and these references in the image that is taken.

In this way, the image may be displayed on a display area in the center, the center-left or the center-right of the display screen according to the adjusted size in S141.

Figure 4:
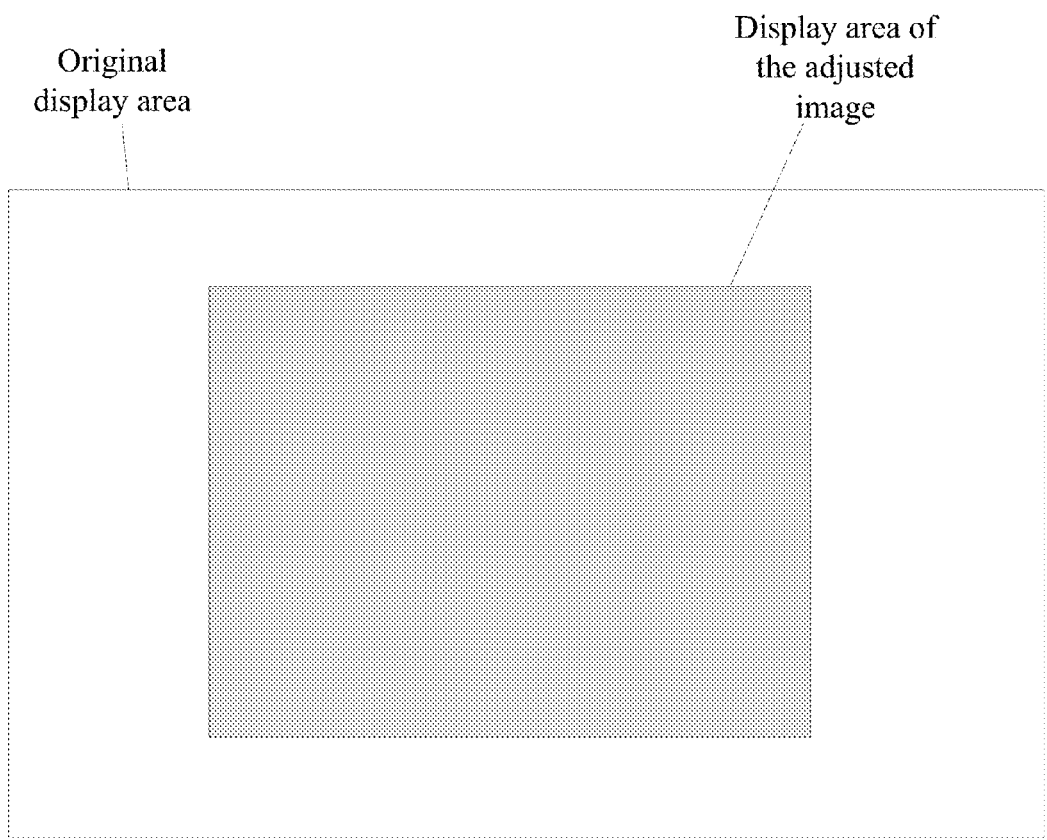
FIGS. 4-6 are block diagrams illustrating different display areas of the adjusted image, according to an exemplary embodiment.
Figure 5:
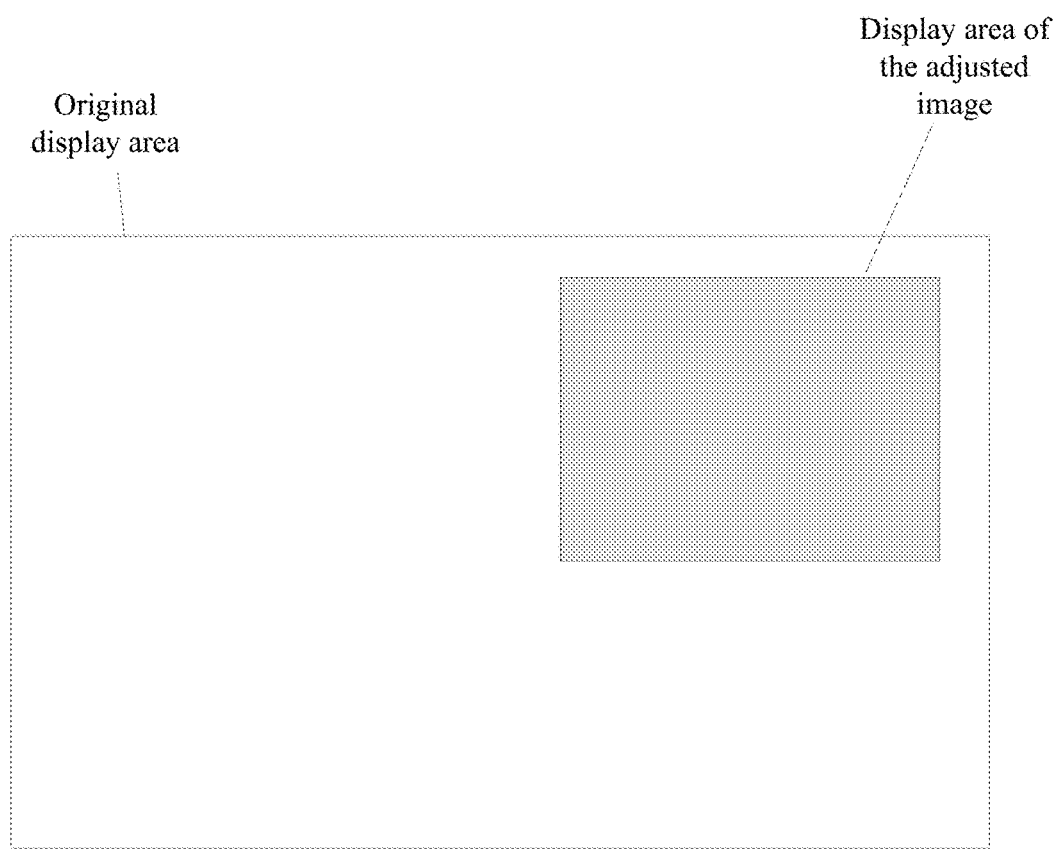
Figure 6:
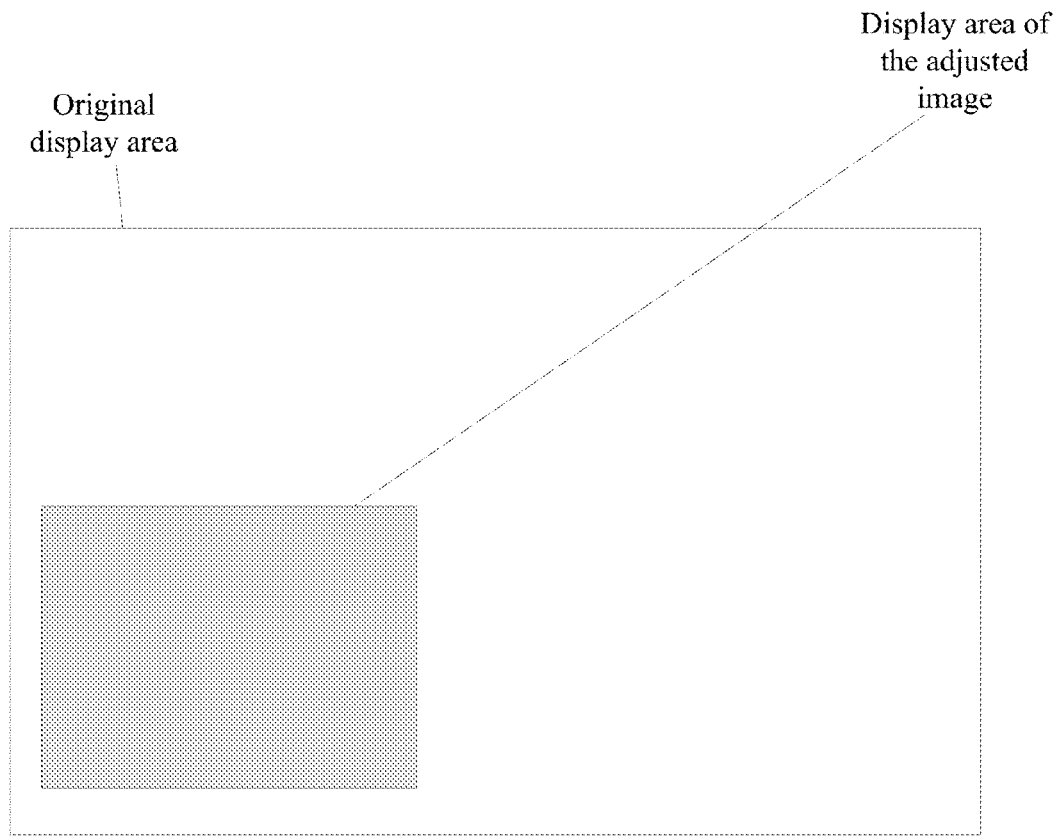

For example, FIGS. 4-6 are block diagrams illustrating different display areas of the adjusted image. In FIGS. 4-6, a white background represents an original display area (the display area before the image is adjusted), and a grey block represents a display area of the adjusted image.

FIG. 4 is a block diagram illustrating an adjusted image displayed in the center, FIG. 5 is a block diagram illustrating an adjusted image displayed in the center-right, and FIG. 6 is a block diagram illustrating an adjusted image displayed in the center-left.

Certainly, FIGS. 4-6 are schematic only, and are not restrictive of the specific display position.

The foregoing determining the display area of the adjusted image according to the relative orientation between the user and the display screen has the following advantages: the adjusted image may be displayed in the center, in the center-left or in the center-right according to the relative position between the user and the display screen; when the user is located at a center-left position of the display screen, the adjusted image is also located in an area that is in the center-left of the display screen; when the user is located at a center-right position of the display screen, the adjusted image is also located in an area that is in the center-right of the display screen; and when the user is located directly in front of the display screen, the adjusted image is displayed in the center of the display screen. In this way, when the user is watching, the angle of view for the eyes to rotate will not be too big (within ±15 degrees), which will not cause visual fatigue, thus ensuring excellent viewing effects and protecting the eyesight of the user.

Figure 7:
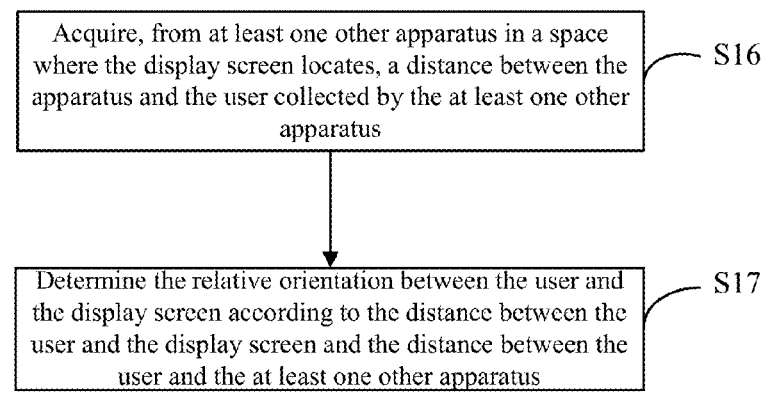
FIG. 7 is a third flow chart of a method for adjusting and displaying an image, according to an exemplary embodiment.

In another embodiment, in the case of monitoring the wireless signal sent by the user and determining the distance between the user and the display screen according to the intensity of the wireless signal in step S11, the foregoing method may also include the following steps S16-S17 as shown in FIG. 7.

In step S16, from at least one other apparatus in a space where the display screen locates, a distance between the apparatus and the user collected by the at least one other apparatus is acquired, the at least one other apparatus being fixedly located at different orientations in the space, and determining the distance between the at least one other apparatus and the user through monitoring the intensity of the wireless signal sent by the user.

In step S17, the relative orientation between the user and the display screen is determined according to the distance between the user and the display screen and the distance between the user and the at least one other apparatus, the relative orientation including: center, center-left and center-right.

The foregoing S16 and S17 are performed independently from S12 or S13, and they are not strictly ordered.

Accordingly, in the foregoing step S14, displaying the image on the display screen according to the adjusted size may be implemented as the following step S141 as shown in FIG. 3.

In step S141, the image is displayed on a display area of the display screen corresponding to the relative orientation according to the adjusted size.

Before the foregoing S16 and S17, it is desirable to provide at least one other fixed apparatus in the space where the display screen locates in advance, this or these other apparatuses also have the ability of sending wireless signals, can scan surrounding apparatuses that send the same wireless signals, and establish a wireless connection. In this way, when establishing a wireless connection between the display screen of the player terminal and the user, a wireless connection is also established between the user and this or these apparatuses as well. Moreover, the distance between the other apparatus and the user can be calculated through the wireless connection. In the foregoing S16, the player terminal may acquire the distance between the display screen and the user, and may acquire the distance between the apparatus and the user acquired by the at least one other apparatus.

Therefore, in step S17, the relative orientation between the user and the display screen of the player terminal may be determined according to the distance between the user and the display screen and the distance between the user and the at least one other apparatus.

Figure 8:
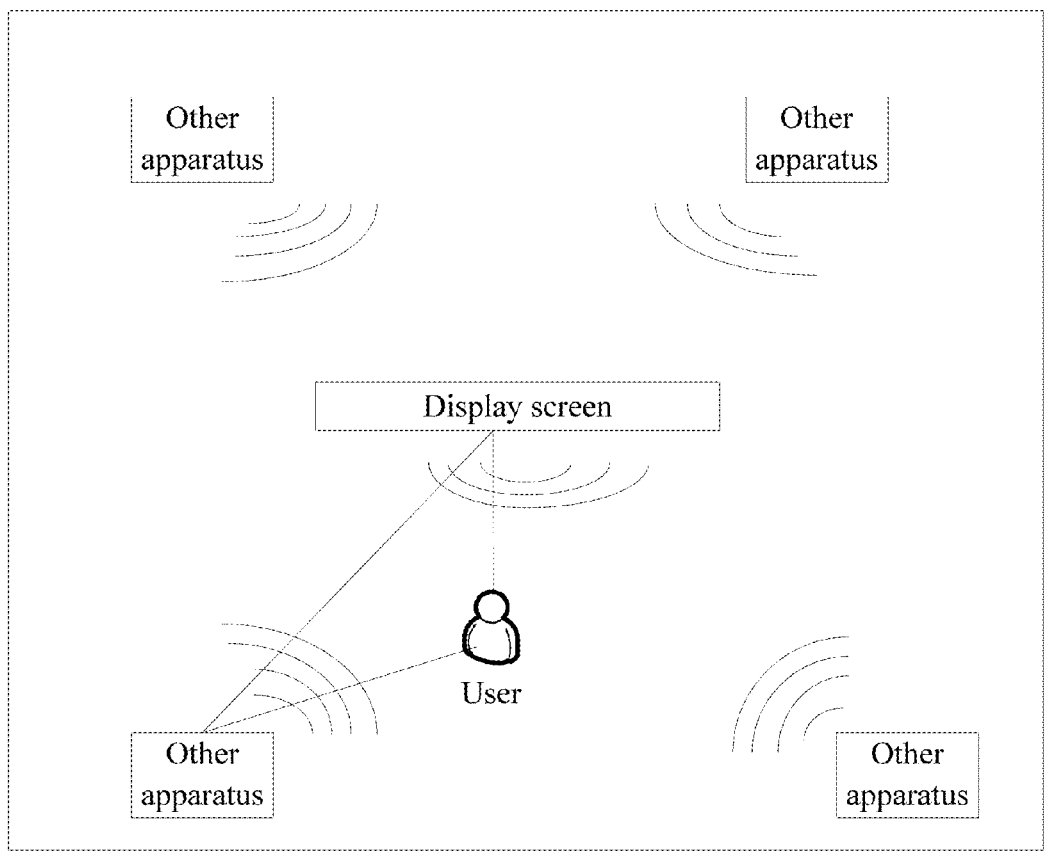
FIG. 8 is a diagram illustrating a positional relationship among a display screen, a user and other apparatus, according to an exemplary embodiment.

As shown in FIG. 8, for a two-dimensional space, the positions of the display screen and other apparatuses are fixed, the coordinates of the display screen and the coordinates of the other apparatuses are known. Then the coordinates of the user in the two-dimensional space may be calculated when the distance between the user and the display screen as well as the distance between the user and the other apparatuses are known. After the coordinates of the user are acquired, the relative orientation between the user and the display screen can be determined.

Certainly, the calculated position of the user is more accurate when there are a plurality of other apparatuses serving as references (more than or equal to two).

In the embodiment, displaying the image on the display area of the display screen corresponding to the relative orientation according to the adjusted size is similar to the forgoing embodiment, and the adjusted image may be displayed in the center, in the center-left or in the center-right according to the relative position between the user and the display screen. Specific implementation process and advantageous effects may refer to the foregoing embodiment.

Figure 9:
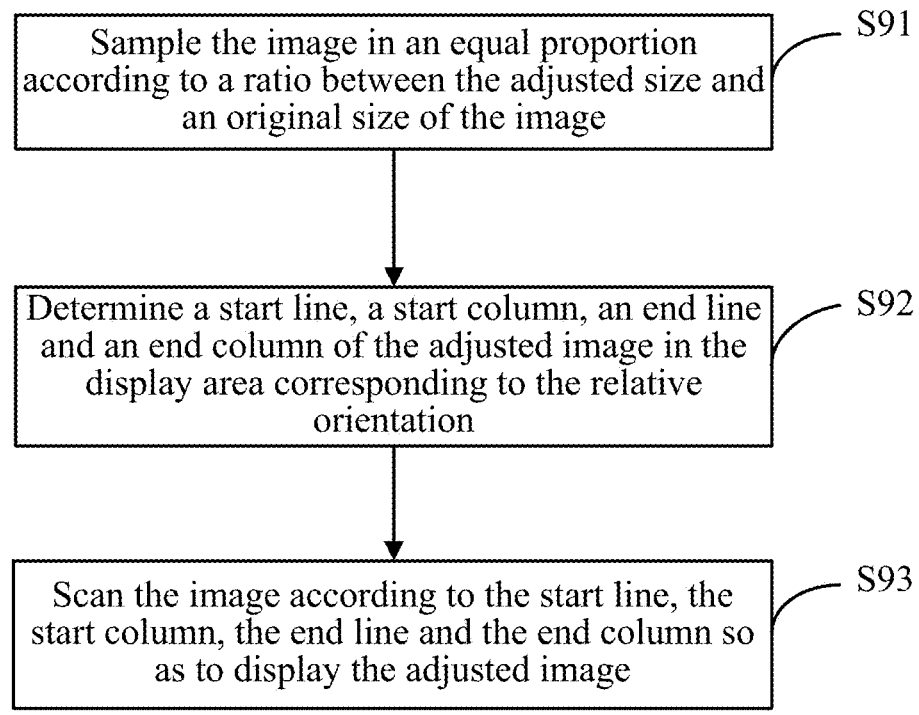
FIG. 9 is a flow chart of step S141, according to an exemplary embodiment.

In one embodiment, as shown in FIG. 9, the foregoing S141 may also be implemented as the following steps S91-S93.

In step S91, the image is sampled in an equal proportion according to a ratio between the adjusted size and the original size of the image.

In step S92, a start line, a start column, an end line and an end column of the adjusted image are determined in the display area corresponding to the relative orientation.

In step S93, the image is scanned according to the start line, the start column, the end line and the end column so as to display the adjusted image.

In the foregoing step S91, for instance, the adjusted height and the adjusted width are ⅔ of the original sizes of the image, then partial pixels in the original image may be extracted by using an algorithm like equal proportion sampling, for example, a manner of uniformly sampling according to ⅔, to form the image whose size has been adjusted.

Certainly, other sampling manners may also be considerable, and proper sampling manners may be employed with reference to the parameter requirements like the resolution of the displayed image.

Because the image is displayed in the display screen in a line-column scanning manner, it is necessary to determine the start line, the start column, the end line and the end column of the image displayed on the display screen. In this way, in step S93, the adjusted image may be scanned and displayed according to the start line, the start column, the end line and the end column.

There may be various scanning manners, for example, line by line scanning or interlaced scanning.

The line by line scanning refers to scanning line by line from top to bottom (illuming each display unit on the screen).

The interlaced scanning refers to performing line scanning on odd lines and even lines respectively to obtain a complete image. Usually, the odd lines are scanned first and then the even lines are scanned.

Any scanning manner can be employed as long as the adjusted image can be displayed in the display area corresponding to the relative orientation between the display screen and the user.

In one embodiment, after displaying the image on the display screen according to the adjusted size in step S14, the method further includes: when monitoring that the distance between the user and the display screen is greater than or equal to the preset threshold for a preset duration, restoring the image to an original size and displaying the restored image on the display screen.

The foregoing embodiment is with respect to the case that the user changes the viewing position and goes back to a proper viewing distance again. In this case, in order to avoid misjudgment on the user behaviors, it is desirable to determine whether the position change lasts for the preset duration after the user changes the distance between the user and the display screen. If yes, then it is determined that the user really changes the viewing position. Then the solution of quitting the foregoing S11-S14 is triggered, and the image is restored to the original size and displayed. The solution of adaptively adjusting the size of the image according to the change of the position of the user can better provide the user with comfortable viewing experience and protect the eyesight of the user at the same time.

The method for adjusting and displaying an image provided by the embodiments of the present disclosure is explained hereinafter with a specific example.

Figure 10:
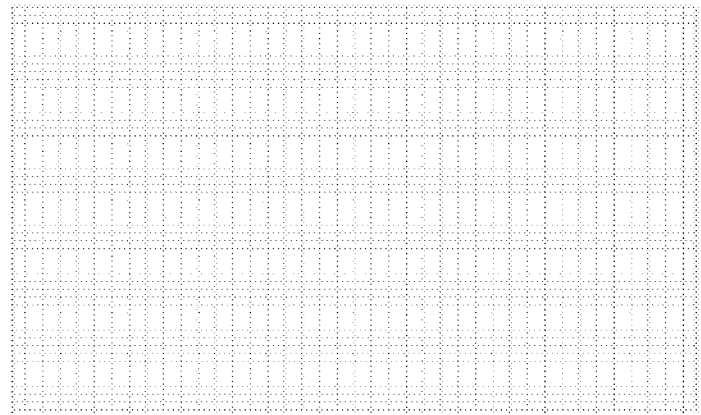
FIG. 10 is a diagram illustrating a pixel arrangement on a display screen, according to an exemplary embodiment.
Figure 11:
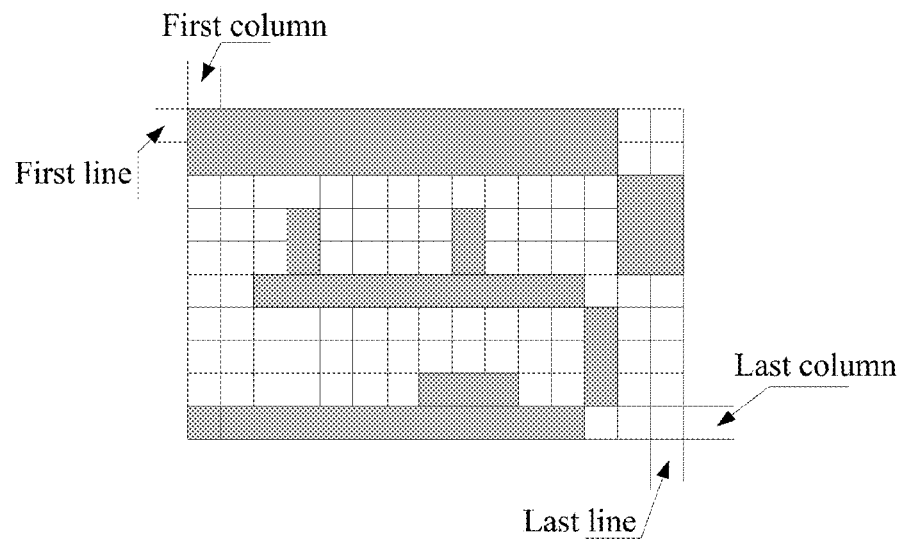
FIG. 11 is a block diagram illustrating an adjusted image, according to an exemplary embodiment.

In the specific example, take an LCD display screen of a LCD TV for example. The pixel arrangements on the display screen are as shown in FIG. 10, wherein each pixel is composed of three sub-pixels (for example, RGB format). In the event that when the distance between the user and the LCD display screen is less than a preset distance, the adjusted height and the adjusted width of the image calculated according to the distance between the user and the LCD display screen are ⅔ of the original image, then the adjust image as shown in FIG. 11 (to facilitate understanding, a certain number of pixels are displayed, and the actual pixels of the image will be more than that shown in the drawing) is acquired according to a ⅔ equal-proportion sampling manner.

Figure 12:
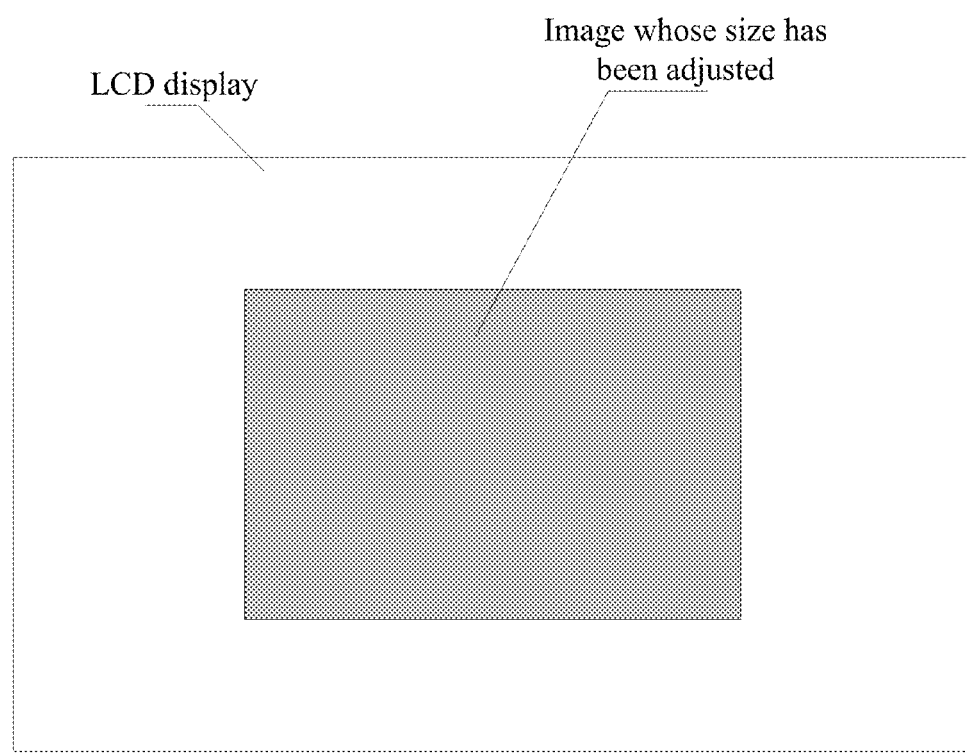
FIG. 12 is a block diagram illustrating that the image is displayed in a centered manner in a LCD display screen, according to an exemplary embodiment.

It is determined that the user is located in the center of the display screen according to a relative orientation between the user and the LCD display screen. Then it may be further determined that the adjusted image is displayed in the center of the display screen. Moreover, a first line and a last line as well as a first column and a last column of the adjusted image in the display area are determined, the pixels of the sampled image are scanned line by line according to the determined first line and the last line as well as the first column and the last column via a preset scanning manner (i.e., line by line scanning) of the LCD TV, so that the image displayed in the center of the LCD display screen is as shown in FIG. 12.

Figure 13:
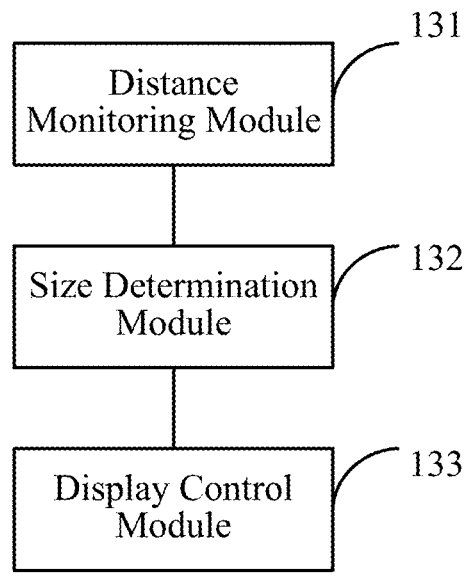
FIG. 13 is a block diagram illustrating a device for adjusting and displaying an image, according to an exemplary embodiment.

FIG. 13 is a block diagram illustrating a device for adjusting and displaying an image, according to an exemplary embodiment. As shown in FIG. 13, the device includes a distance monitoring module 131, a size determination module 132 and a display control module 133.

The distance monitoring module 131 is configured to monitor a distance between a user in front of a display screen and the display screen.

The size determination module 132 is configured to, when monitoring that the distance between the user and the display screen is less than a preset threshold, determine an adjusted size of an image on the display screen according to the distance, or determine an adjusted size of an image on the display screen according to a parameter preset by the user.

The display control module 133 is configured to display the image on the display screen according to the adjusted size.

With respect to the devices in the above embodiments, the specific manners for performing operations for individual modules therein have been described in detail in the embodiments regarding the methods, which will not be elaborated herein.

Figure 14:
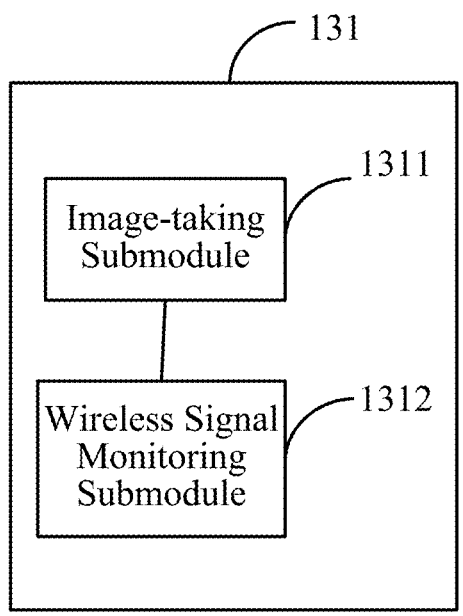
FIG. 14 is a block diagram illustrating a distance monitoring module 131, according to an exemplary embodiment.

In one embodiment, as shown in FIG. 14, the distance monitoring module 131 includes one or more of the following modules: an image-taking submodule 1311 configured to take an image of the user, and determine the distance between the user and the display screen according to the image that is taken; and a wireless signal monitoring submodule 1312 configured to monitor a wireless signal sent by the user, and determine the distance between the user and the display screen according to an intensity of the wireless signal.

Figure 15:
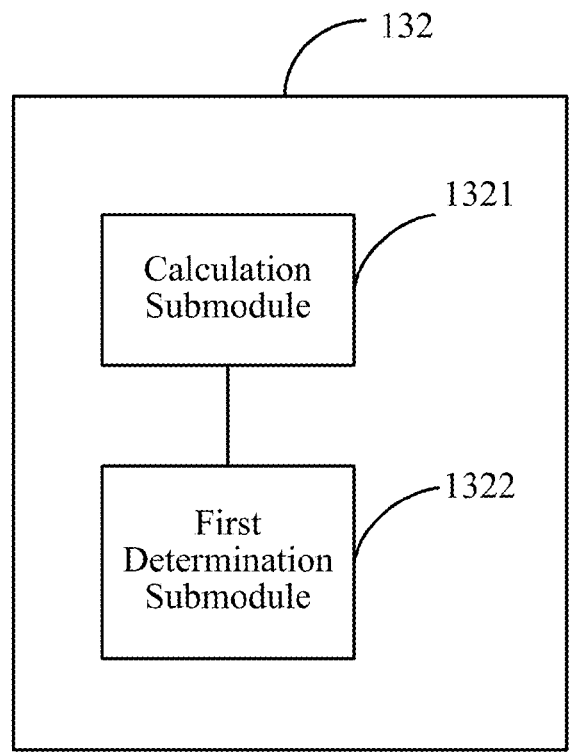
FIG. 15 is a block diagram illustrating a size determination module 132, according to an exemplary embodiment.

In one embodiment, as shown in FIG. 15, the size determination module 132 includes: a calculation submodule 1321 configured to calculate an adjusted height of the image according to S=n*H, S being the distance between the user and the display screen, H being the adjusted height of the image, and a range of n being [3.5,5]; and a first determination submodule 1322 configured to determine an adjusted width of the image according to a preset aspect ratio of the image and the adjusted height of the image.

Figure 16:
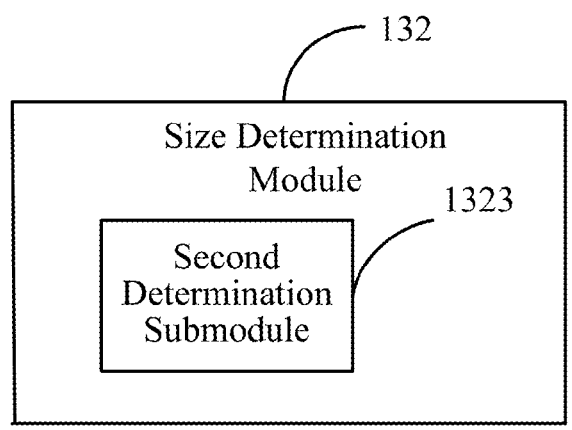
FIG. 16 is another block diagram illustrating the size determination module 132, according to an exemplary embodiment.

In another embodiment, as shown in FIG. 16, the size determination module 132 includes: a second determination submodule 1323 configured to determine an adjusted height and an adjusted width of the image on the display screen according to a scaling preset by the user and an original height and an original width of the image.

In one embodiment, as shown in FIG. 13, the foregoing device further includes: an orientation determination module 134; the orientation determination module 134 being configured to determine a relative orientation between the user and the display screen according to a location of the user in the image that is taken, the relative orientation including: center, center-left and center-right; and the display control module 133 being also configured to display the image on a display area of the display screen corresponding to the relative orientation according to the adjusted size.

In another embodiment, as shown in FIG. 13, the foregoing device further includes: an orientation determination module 134; the orientation determination module 134 being configured to acquire, from at least one other apparatus in a space where the display screen locates, a distance between the apparatus and the user collected by the at least one other apparatus, the at least one other apparatus being fixedly located at different orientations in the space, and determining the distance between the at least one other apparatus and the user through monitoring the intensity of the wireless signal sent by the user; and determine the relative orientation between the user and the display screen according to the distance between the user and the display screen and the distance between the user and the at least one other apparatus, the relative orientation including: center, center-left and center-right; and the display control module 133 being also configured to display the image on a display area of the display screen corresponding to the relative orientation according to the adjusted size.

Figure 17:
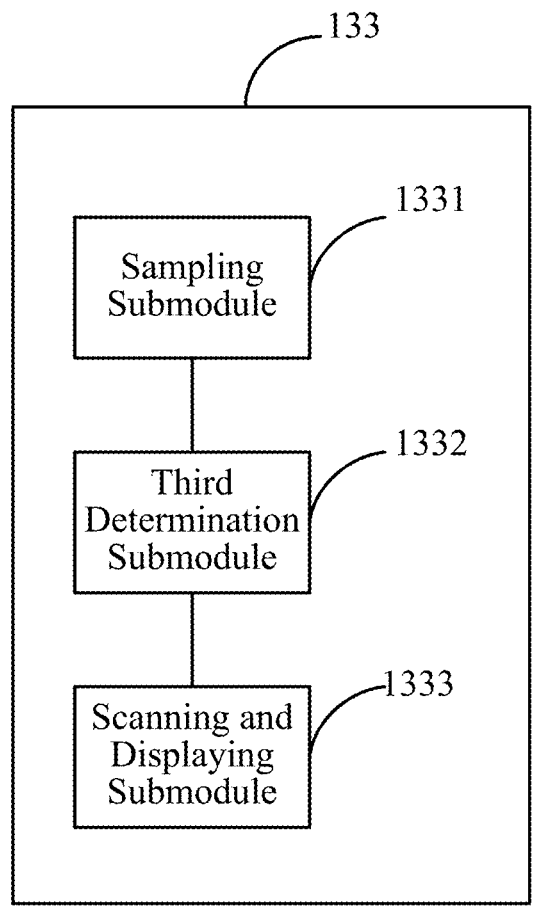
FIG. 17 is a block diagram illustrating a display control module 133, according to an exemplary embodiment.

In one embodiment, as shown in FIG. 17, the display control module 133 in the foregoing device includes: a sampling submodule 1331 configured to sample the image in an equal proportion according to a ratio between the adjusted size and the original size of the image; a third determination submodule 1332 configured to determine a start line, a start column, an end line and an end column of the adjusted image in the display area corresponding to the relative orientation; and a scanning and displaying submodule 1333 configured to scan the image according to the start line, the start column, the end line and the end column so as to display the adjusted image.

In one embodiment, the size determination module 132 is also configured to, when monitoring that the distance between the user and the display screen is greater than or equal to the preset threshold for a preset duration, restore the image to an original size after displaying the image on the display screen. Accordingly, the display control module 133 is configured to display the image on the display screen according to the original size.

The embodiments of the present disclosure also provide a device for adjusting and displaying an image, including: a processor; and a memory for storing instructions executable by the processor; wherein the processor is configured to: monitor a distance between a user in front of a display screen and the display screen; when monitoring that the distance between the user and the display screen is less than a preset threshold, determine an adjusted size of an image on the display screen according to the distance, or determine an adjusted size of an image on the display screen according to a parameter preset by the user; and display the image on the display screen according to the adjusted size.

Figure 18:
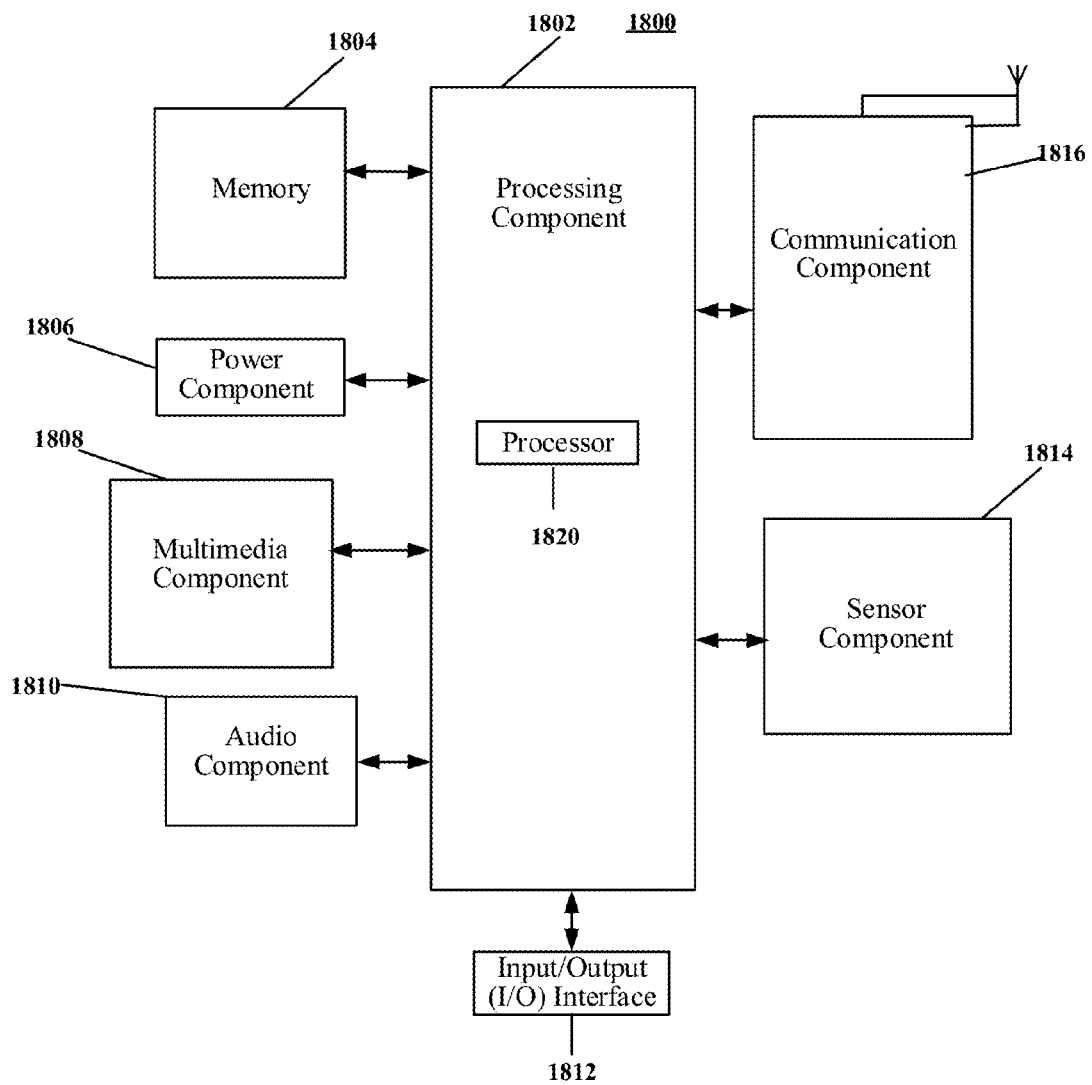
FIG. 18 is a block diagram illustrating a device for adjusting and displaying an image, according to an exemplary embodiment.

FIG. 18 is a block diagram illustrating a device 1800 for adjusting and displaying images, according to an exemplary embodiment. For example, the device 1800 may be a mobile phone, a computer, a digital broadcast terminal, a messaging device, a gaming console, a tablet, a medical device, exercise equipment, a personal digital assistant, and the like.

Referring to FIG. 18, the device 1800 may include one or more of the following components: a processing component 1802, a memory 1804, a power component 1806, a multimedia component 1808, an audio component 1810, an input/output (I/O) interface 1812, a sensor component 1814, and a communication component 1816.

The processing component 1802 typically controls overall operations of the device 1800, such as the operations associated with display, telephone calls, data communications, camera operations, and recording operations. The processing component 1802 may include one or more processors 1820 to execute instructions to perform all or part of the steps in the above described methods. Moreover, the processing component 1802 may include one or more modules which facilitate the interaction between the processing component 1802 and other components. For instance, the processing component 1802 may include a multimedia module to facilitate the interaction between the multimedia component 1808 and the processing component 1802.

The memory 1804 is configured to store various types of data to support the operation of the device 1800. Examples of such data include instructions for any applications or methods operated on the device 1800, contact data, phonebook data, messages, pictures, video, etc. The memory 1804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1806 provides power to various components of the device 1800. The power component 1806 may include a power management system, one or more power sources, and any other components associated with the generation, management, and distribution of power in the device 1800.

The multimedia component 1808 includes a screen providing an output interface between the device 1800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1808 includes a front camera and/or a rear camera. The front camera and/or the rear camera may receive an external multimedia datum while the device 1800 is in an operation mode, such as a photographing mode or a video mode. Each of the front camera and the rear camera may be a fixed optical lens system or have focus and optical zoom capability.

The audio component 1810 is configured to output and/or input audio signals. For example, the audio component 1810 includes a microphone ("MIC") configured to receive an external audio signal when the device 1800 is in an operation mode, such as a call mode, a recording mode, and a voice recognition mode. The received audio signal may be further stored in the memory 1804 or transmitted via the communication component 1816. In some embodiments, the audio component 1810 further includes a speaker to output audio signals.

The I/O interface 1812 provides an interface between the processing component 1802 and peripheral interface modules, such as a keyboard, a click wheel, buttons, and the like. The buttons may include, but are not limited to, a home button, a volume button, a starting button, and a locking button.

The sensor component 1814 includes one or more sensors to provide status assessments of various aspects of the device 1800. For instance, the sensor component 1814 may detect an open/closed status of the device 1800, relative positioning of components, e.g., the display and the keypad, of the device 1800, a change in position of the device 1800 or a component of the device 1800, a presence or absence of user contact with the device 1800, an orientation or an acceleration/deceleration of the device 1800, and a change in temperature of the device 1800. The sensor component 1814 may include a proximity sensor configured to detect the presence of nearby objects without any physical contact. The sensor component 1814 may also include a light sensor, such as a CMOS or CCD image sensor, for use in imaging applications. In some embodiments, the sensor component 1814 may also include an accelerometer sensor, a gyroscope sensor, a magnetic sensor, a pressure sensor, or a temperature sensor.

The communication component 1816 is configured to facilitate communication, wired or wirelessly, between the device 1800 and other devices. The device 1800 can access a wireless network based on a communication standard, such as WiFi, 2G, or 3G, or a combination thereof. In one exemplary embodiment, the communication component 1816 receives a broadcast signal or broadcast associated information from an external broadcast management system via a broadcast channel. In one exemplary embodiment, the communication component 1816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1804, executable by the processor 1820 in the device 1800, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium is executed by a processor of the mobile terminal, enables the mobile terminal to perform the method for adjusting and displaying an image, the method including: monitoring a distance between a user in front of a display screen and the display screen; when monitoring that the distance between the user and the display screen is less than a preset threshold, determining an adjusted size of an image on the display screen according to the distance, or determining an adjusted size of an image on the display screen according to a parameter preset by the user; and displaying the image on the display screen according to the adjusted size.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for adjusting and displaying an image, comprising:
    monitoring a distance between a user in front of a display screen and the display screen;
    when monitoring that the distance between the user and the display screen is less than a preset threshold, determining an adjusted size of an image on the display screen according to the distance;
    acquiring, from at least one other apparatus in a space where the display screen locates, a distance between the apparatus and the user collected by the at least one other apparatus, wherein the at least one other apparatus is fixedly located at different orientations in the space, and is configured to determine the distance between the at least one other apparatus and the user through monitoring an intensity of a wireless signal sent by an electronic device carried by the user;
    determining a relative orientation between the user and the display screen according to the distance between the user and the display screen and the distance between the user and the at least one other apparatus, wherein the relative orientation comprises: center, center-left or center-right; and
    displaying the image on a display area of the display screen corresponding to the relative orientation according to the adjusted size.

2. The method according to claim 1, wherein monitoring the distance between the user and the display screen comprises one or more of the following manners:
    taking an image of the user, and determining the distance between the user and the display screen according to the taken image; and
    monitoring a wireless signal sent by the user, and determining the distance between the user and the display screen according to an intensity of the wireless signal.

3. The method according to claim 2, wherein the method, when taking the image of the user and determining the distance between the user and the display screen according to the taken image, further comprises:

determining a relative orientation between the user and the display screen according to a position of the user in the taken image, the relative orientation comprising: center, center-left and center-right; and displaying the image on the display screen according to the adjusted size comprises:

displaying the image on a display area of the display screen corresponding to the relative orientation according to the adjusted size.

4. The method according to claim 3, wherein displaying the image on the display area of the display screen corresponding to the relative orientation according to the adjusted size comprises:

proportionally sampling the image according to a ratio between the adjusted size and an original size of the image;

determining a start line, a start column, an end line and an end column of the adjusted image in the display area corresponding to the relative orientation; and scanning the image according to the start line, the start column, the end line and the end column so as to display the adjusted image.

5. The method according to claim 1, wherein determining the adjusted size of the image on the display screen according to the distance comprises:

calculating an adjusted height of the image according to S=n*H, S being the distance between the user and the display screen, H being the adjusted height of the image, and a range of n being [3.5,5]; and determining an adjusted width of the image according to a preset aspect ratio of the image and the adjusted height of the image.

6. The method according to claim 1, further comprising: when monitoring that the distance between the user and the display screen is less than the preset threshold, determining the adjusted size of the image on the display screen according to a parameter preset by the user rather than determining according to the distance, wherein determining the adjusted size of the image on the display screen according to the parameter preset by the user comprises:

determining an adjusted height and an adjusted width of the image on the display screen according to a scaling preset by the user and an original height and an original width of the image.

7. The method according to claim 1, wherein displaying the image on the display area of the display screen corresponding to the relative orientation according to the adjusted size comprises:

proportionally sampling the image according to a ratio between the adjusted size and an original size of the image;

determining a start line, a start column, an end line and an end column of the adjusted image in the display area corresponding to the relative orientation; and scanning the image according to the start line, the start column, the end line and the end column so as to display the adjusted image.

8. The method according to claim 1, wherein the method, after the displaying the image on the display screen according to the adjusted size, further comprises:

when monitoring that the distance between the user and the display screen is greater than or equal to the preset threshold for a preset duration, restoring the image to an original size and displaying the image on the display screen.

9. A device for adjusting and displaying an image, comprising:

a processor;

a display screen; and a memory for storing instructions executable by the processor;

wherein the processor is configured to:

monitor a distance between a user in front of the display screen and the display screen;

when monitoring that the distance between the user and the display screen is less than a preset threshold, determine an adjusted size of an image on the display screen according to the distance;

acquire, from at least one other apparatus in a space where the display screen locates, a distance between the apparatus and the user collected by the at least one other apparatus, wherein the at least one other apparatus is fixedly located at different orientations in the space, and is configured to determine the distance between the at least one other apparatus and the user through monitoring an intensity of a wireless signal sent by an electronic device carried by the user;

determine a relative orientation between the user and the display screen according to the distance between the user and the display screen and the distance between the user and the at least one other apparatus, wherein the relative orientation comprises: center, center-left or center-right; and display the image on a display area of the display screen corresponding to the relative orientation according to the adjusted size.

10. The device according to claim 9, wherein the processor is further configured to:

take an image of the user, and determine the distance between the user and the display screen according to the taken image; and monitor a wireless signal sent by the user, and determine the distance between the user and the display screen according to an intensity of the wireless signal.

11. The device according to claim 10, wherein the processor is further configured to:

determine a relative orientation between the user and the display screen according to a position of the user in the taken image, the relative orientation comprising: center, center-left and center-right; and display the image on a display area of the display screen corresponding to the relative orientation according to the adjusted size.

12. The device according to claim 11, wherein the processor is further configured to:

proportionally sample the image according to a ratio between the adjusted size and an original size of the image;

determine a start line, a start column, an end line and an end column of the adjusted image in the display area corresponding to the relative orientation; and scan the image according to the start line, the start column, the end line and the end column so as to display the adjusted image.

13. The device according to claim 9, wherein the processor is further configured to:

calculate an adjusted height of the image according to S=n*H, S being the distance between the user and the display screen, H being the adjusted height of the image, and a range of n being [3.5,5]; and determine the adjusted width of the image according to a preset aspect ratio of the image and the adjusted height of the image.

14. The device according to claim 9, wherein the processor is further configured to:

when monitoring that the distance between the user and the display screen is less than the preset threshold, determine the adjusted size of the image on the display screen according to a parameter preset by the user rather than determining according to the distance, and wherein the processor is further configured to:

determine an adjusted height and an adjusted width of the image on the display screen according to a scaling preset by the user and an original height and an original width of the image.

15. The device according to claim 9, wherein the processor is further configured to:

proportionally sample the image according to a ratio between the adjusted size and an original size of the image;

determine a start line, a start column, an end line and an end column of the adjusted image in the display area corresponding to the relative orientation; and scan the image according to the start line, the start column, the end line and the end column so as to display the adjusted image.

16. The device according to claim 9, wherein the processor is further configured to:

after displaying the image on the display screen according to the adjusted size, when monitoring that the distance between the user and the display screen is greater than or equal to the preset threshold for a preset duration, restore the image to an original size; and display the image on the display screen according to the original size.

17. A non-transitory readable storage medium comprising instructions, executable by a processor in a device, for performing a method for adjusting and displaying an image, the method comprising:

monitoring a distance between a user in front of a display screen and the display screen;

when monitoring that the distance between the user and the display screen is less than a preset threshold, determining an adjusted size of an image on the display screen according to the distance;

acquiring, from at least one other apparatus in a space where the display screen locates, a distance between the apparatus and the user collected by the at least one other apparatus, wherein the at least one other apparatus is fixedly located at different orientations in the space, and is configured to determine the distance between the at least one other apparatus and the user through monitoring an intensity of a wireless signal sent by an electronic device carried by the user;

determining a relative orientation between the user and the display screen according to the distance between the user and the display screen and the distance between the user and the at least one other apparatus, wherein the relative orientation comprises: center, center-left or center-right; and displaying the image on a display area of the display screen corresponding to the relative orientation according to the adjusted size.

* * * * *